(12) United States Patent
Surve et al.

(10) Patent No.: US 11,041,556 B2
(45) Date of Patent: Jun. 22, 2021

(54) ELECTRONICALLY ACTUATED LOCKING DIFFERENTIAL HAVING LOCK DETECTION MECHANISM

(71) Applicant: Eaton Intelligent Power Limited, Dublin (IE)

(72) Inventors: Rupesh Madhukar Surve, Pune (IN); Swapnil Shivaji Kadam, Pune (IN); Chad Robert Hillman, Ceresco, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/558,649

(22) Filed: Sep. 3, 2019

(65) Prior Publication Data
US 2019/0383378 A1 Dec. 19, 2019

Related U.S. Application Data

(63) Continuation of application No. PCT/US2018/020808, filed on Mar. 3, 2018.

(30) Foreign Application Priority Data

Mar. 3, 2017 (IN) .............................. 201711007647

(51) Int. Cl.
*F16H 48/34* (2012.01)
*F16H 48/24* (2006.01)
(Continued)

(52) U.S. Cl.
CPC ............. *F16H 48/34* (2013.01); *F16H 48/24* (2013.01); *F16H 48/40* (2013.01); *F16H 48/08* (2013.01)

(58) Field of Classification Search
CPC .......... F16H 48/34; F16H 48/24; F16H 48/08; F16D 2300/18; F16D 2129/08
See application file for complete search history.

(56) References Cited

U.S. PATENT DOCUMENTS 7,357,749 B2 4/2008 Nofzinger et al.
10,488,224 B2 * 11/2019 Creech ................... G01D 5/145
(Continued)

FOREIGN PATENT DOCUMENTS

| JP | 2013065796 A | 4/2013 |
| WO | 2015175847 A1 | 11/2015 |
| WO | 2017034691 A1 | 3/2017 |

OTHER PUBLICATIONS

International Search Report and Written Opinion for International Application No. PCT/US2018/020808 dated Jun. 14, 2018.
(Continued)

*Primary Examiner* — Stacey A Fluhart
(74) *Attorney, Agent, or Firm* — RMCK Law Group PLC

(57) ABSTRACT

An electronically locking differential assembly constructed in accordance to the present disclosure includes a differential casing, a first and second side gear, a lock actuation assembly and a lock detect mechanism. The first gear defines a first shaft opening configured to provide a first torque transmitting connection with a first output shaft received within the first output shaft opening. The second side gear defines a second output shaft opening configured to provide a second torque transmitting connection with a second output shaft received within the second output shaft opening. The lock actuation mechanism selectively moves between a locked state where the side gears are fixed for concurrent rotation and an unlocked state where the side gears rotate relative to each other. The lock detect mechanism detects whether the lock actuation mechanism is in the locked or unlocked state.

14 Claims, 6 Drawing Sheets

(51) Int. Cl.
   *F16H 48/40*   (2012.01)
   *F16H 48/08*   (2006.01)

(56) References Cited

U.S. PATENT DOCUMENTS

| | | |
|---|---|---|
| 2005/0279607 A1 | 12/2005 | Fusegi |
| 2012/0252621 A1 | 10/2012 | Seidl et al. |
| 2015/0133254 A1 | 5/2015 | Fox |

OTHER PUBLICATIONS

Supplemental European Search Report for EP Application No. 18761649 dated Nov. 17, 2020.

\* cited by examiner

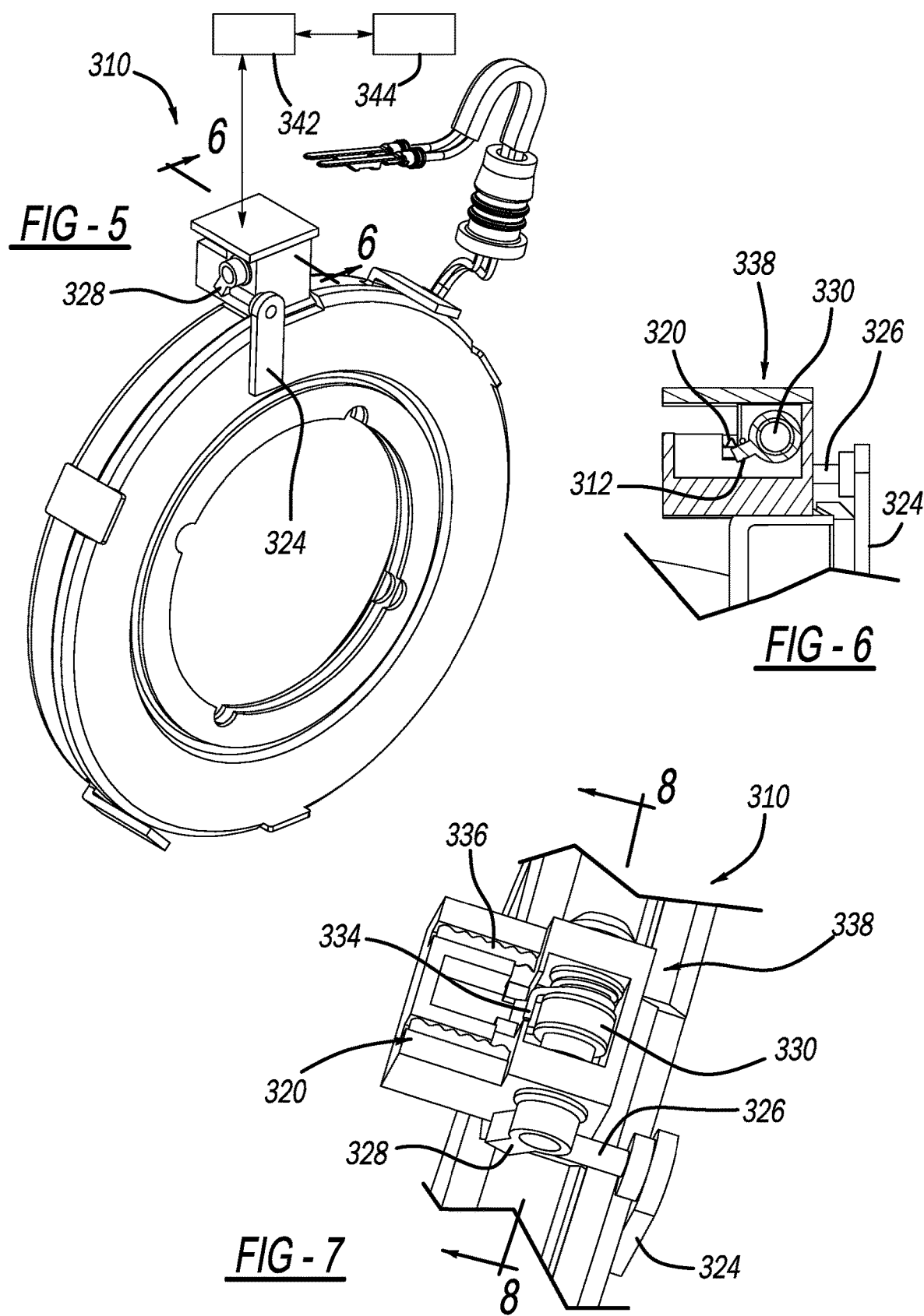

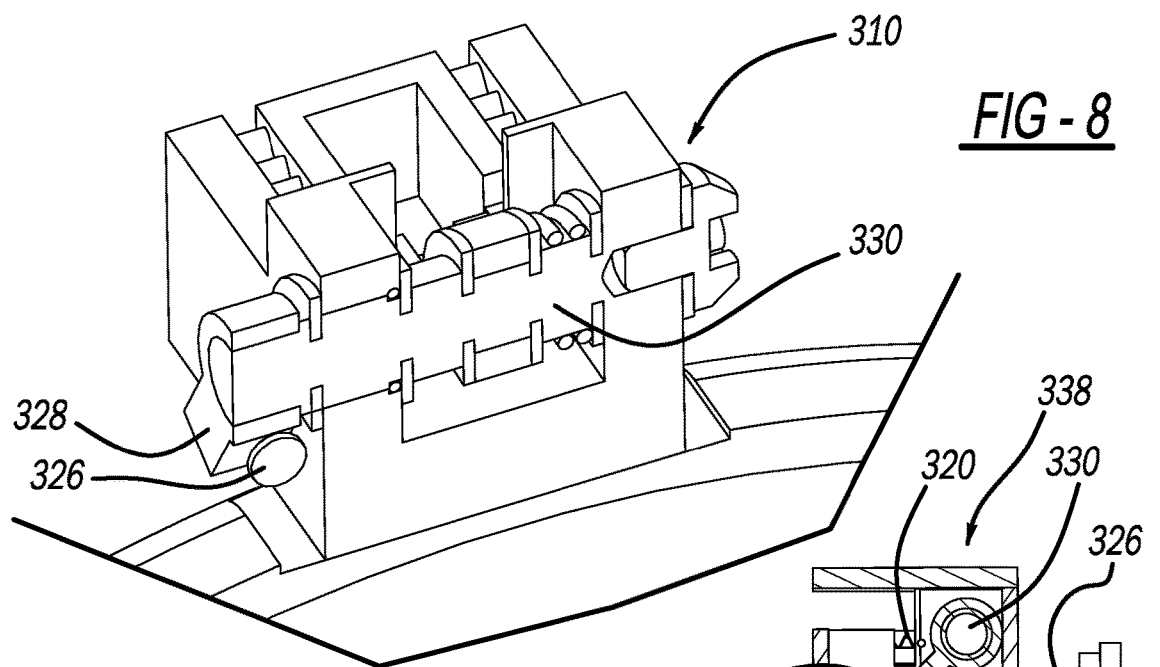
FIG - 8
FIG - 10
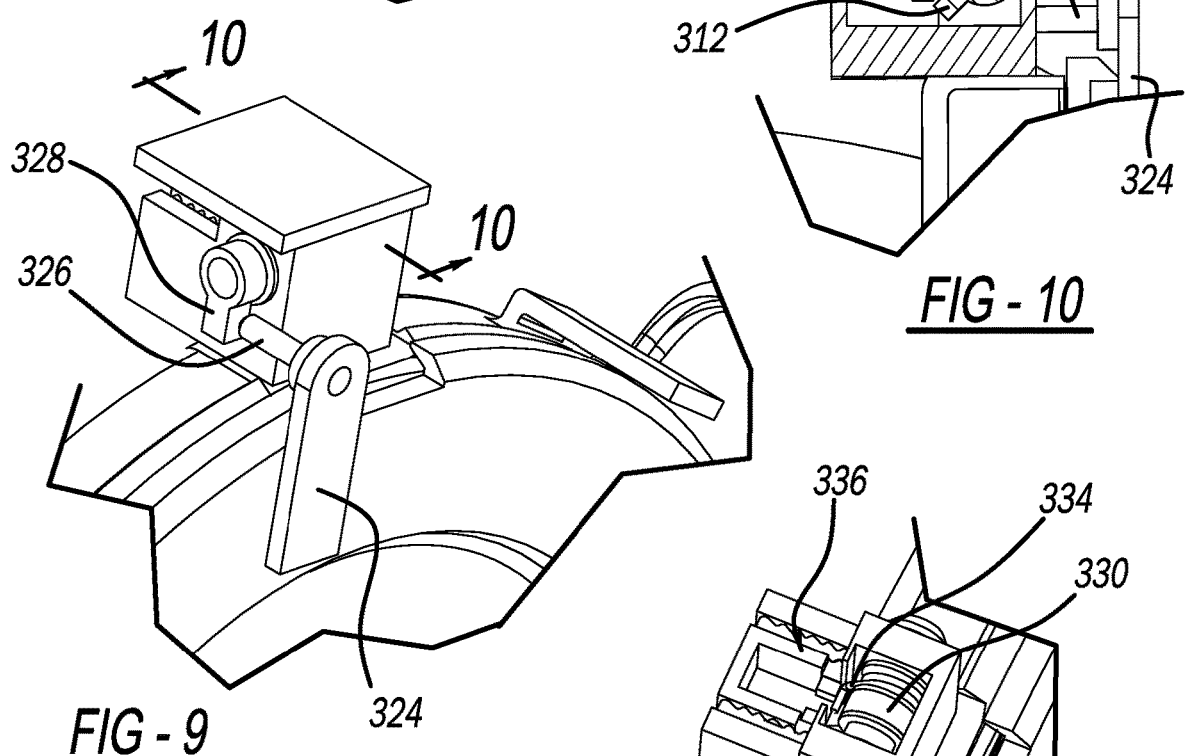
FIG - 9
FIG - 11

ELECTRONICALLY ACTUATED LOCKING DIFFERENTIAL HAVING LOCK DETECTION MECHANISM

CROSS-REFERENCE TO RELATED APPLICATIONS

This application is a continuation of International Application No. PCT/US2018/020808 filed Mar. 3, 2018, which claims priority to Indian Provisional Application No. 201711007647 filed on Mar. 3, 2017. The disclosure of the above application is incorporated herein by reference.

FIELD

The present disclosure relates generally to differential gear assemblies and more particularly to an electronically actuated locking differential having a lock detection mechanism.

BACKGROUND

A differential gear mechanism can be provided in an axle assembly and used to transfer torque from a driveshaft to a pair of output shafts. The driveshaft can drive the differential through the use of a bevel gear that meshes with a ring gear mounted to a housing of the differential. In automotive applications, a differential allows the tires mounted at either end of the axle assembly to rotate at different speeds. This is important when the vehicle is turning because the outer tire travels over an arc of greater distance than the inner tire. Thus, the outer tire must rotate at a faster speed than the inner tire to compensate for the greater distance of travel. The differential includes a differential case and a gear arrangement that allows torque to be transferred from the driveshaft to the output shafts while concurrently allowing the output shafts to rotate at different speeds as needed. The gear arrangement can generally include a pair of side gears that are mounted for rotation with the respective output shafts. A series of cross pins or pinion gear shafts are fixedly mounted to the differential case for rotation therewith. A corresponding plurality of pinion gears are mounted for rotation with the pinion gear shafts and are in meshing relationship with both of the side gears.

Some differential gear mechanisms include traction modifying differentials such as those that provide a locking function. Locking differentials include some sort of locking mechanism to prevent rotation of one of the side gears relative to the gear case, the engagement of the locking mechanism being initiated by some sort of actuator. By way of example only, the actuator could include a ball ramp mechanism in which rotation of a ramp plate is retarded relative to the gear case, this initiating ramping, in response to a signal being transmitted to an electromagnetic coil disposed adjacent the ramp plate. Other configurations are direct acting and utilize a dog clutch that is moved to interlock with the side gear by pressed in rods that are moved by movement of an armature as the coil is energized. In this regard, many configurations are available. Examples of locking differentials of the type described hereinabove are shown in U.S. Pat. Nos. 6,083,134 and 6,551,209, both of which are assigned to the assignee of the present disclosure and incorporated herein by reference. In such examples, transmitting an input signal to the electromagnetic coil results in a locking member engaging a mating portion associated with the differential side gear disposed adjacent the actuator arrangement. In some instances, the differential can remain locked after switching off the electromagnetic coil such as due to torque trap between dog teeth.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

An electronically locking differential assembly constructed in accordance with the present disclosure includes a differential casing, a first and second side gear, a lock actuation assembly and a lock detect mechanism. The differential casing defines first and second output shaft openings that are co-axially aligned along an axis of rotation of the differential casing. The first gear defines a first shaft opening configured to provide a first torque transmitting connection with a first output shaft received within the first output shaft opening. The second side gear defines a second output shaft opening configured to provide a second torque transmitting connection with a second output shaft received within the second output shaft opening. The lock actuation mechanism selectively moves between a locked state where the side gears are fixed for concurrent rotation and an unlocked state where the side gears rotate relative to each other. The lock detect mechanism detects whether the lock actuation mechanism is in the locked or unlocked state.

According to additional features, the lock actuation mechanism includes an armature and a stator assembly. The stator assembly has an electromagnetic coil. The lock detect mechanism includes a first member fixed for concurrent movement with the armature and that moves relative to a second member. The first member can be coupled to a bracket that is fixed for movement with the armature. The first member has first terminals and the second member has second terminals. The first and second terminals move to a predetermined position relative to each other until a switch changes state and sends a signal to a controller indicative of the locked state.

In other features, the armature is configured to translate along a first distance whereby the switch remains in a first state and subsequently translates along a second distance whereby the switch remains in a second state. In one example, the switch is normally open. In another example, the switch is normally closed. The first member rotates upon translation of the bracket.

According to other features, the lock detect mechanism further comprises a biasing member that biases the first member toward an open position indicative of an unlocked state. The first member can comprise a pawl that rotates into contact with the second member. The pawl can be fixed for rotation with a shaft that is caused to rotate upon rotation of a swing arm configured on the lock detection mechanism. A post can be coupled to the bracket. The post can engage and urge the swing arm to rotate upon translation of the bracket. The pair of pinion gears can be intermeshed with the first and second side gears to form a torque transfer arrangement configured for transferring torque between the pinion gears and the first and second side gears to rotate the first and second side gears about the axis of rotation. The torque transfer arrangement also is configured for allowing the first and second side gears to rotate at different rotation speeds with respect to one another about the axis of rotation in the unlocked state. The lock detect mechanism comprises a normally open mechanical switch.

An electronically locking differential assembly constructed in accordance to the present disclosure includes a differential casing, a first and second side gear, a lock actuation assembly and a lock detect mechanism. The differential casing defines first and second output shaft openings that are co-axially aligned along an axis of rotation of the differential casing. The first gear defines a first shaft opening configured to provide a first torque transmitting connection with a first output shaft received within the first output shaft opening. The second side gear defines a second output shaft opening configured to provide a second torque transmitting connection with a second output shaft received within the second output shaft opening. The lock actuation mechanism selectively moves between a locked state where the side gears are fixed for concurrent rotation and an unlocked state where the side gears rotate relative to each other. The lock actuation mechanism has an armature that is configured to translate upon energization of an electromagnetic coil. The lock detect mechanism detects whether the lock actuation mechanism is in the locked or unlocked state. The lock detect mechanism includes a normally open switch that moves between an open position corresponding to the unlocked state and a closed position corresponding to the locked state. The normally open switch has a first member that is configured to move with the armature relative to a second member along a first distance corresponding to the open position and along a second distance corresponding to the closed position.

According to other features, wherein first and second terminals configured on the respective first and second members are a sufficient distance apart along the first distance whereby the normally open switch remains open. The first member can be coupled to a bracket that is fixed for movement with the armature. The first member can comprise a pawl that rotates into contact with the second member, wherein the pawl is fixed for rotation with a shaft that is caused to rotate upon rotation of a swing arm configured on the lock detection mechanism. The lock detect mechanism further comprises a post coupled to a bracket, the post engaging and urging the swing arm to rotate upon translation of the bracket An electronically locking differential assembly constructed in accordance to the present disclosure includes a differential casing, a first and second side gear, a lock actuation assembly and a lock detect mechanism. The differential casing defines first and second output shaft openings that are co-axially aligned along an axis of rotation of the differential casing. The first gear defines a first shaft opening configured to provide a first torque transmitting connection with a first output shaft received within the first output shaft opening. The second side gear defines a second output shaft opening configured to provide a second torque transmitting connection with a second output shaft received within the second output shaft opening. The lock actuation mechanism selectively moves between a locked state where the side gears are fixed for concurrent rotation and an unlocked state where the side gears rotate relative to each other. The lock actuation mechanism has an armature that is configured to translate upon energization of an electromagnetic coil. The lock detect mechanism detects whether the lock actuation mechanism is in the locked or unlocked state. The lock detect mechanism includes a normally closed switch that moves between a closed position corresponding to the unlocked state and an open position corresponding to the locked state. The normally closed switch has a first member that is configured to move with the armature relative to a second member along a first distance corresponding to the closed position and along a second distance corresponding to the open position.

BRIEF DESCRIPTION OF THE DRAWINGS

The present disclosure will become more fully understood from the detailed description and the accompanying drawings, wherein:

FIG. 5 is a perspective view of a normally open lock detection sensor assembly constructed in accordance to another example of the present disclosure and shown in a closed, locked position;

FIG. 6 is a cross-sectional view of the lock detection sensor assembly taken along lines 6-6 of FIG. 5;

FIG. 7 is a perspective view of the normally open lock detection sensor assembly of FIG. 5 and shown with the cover removed for illustration;

FIG. 8 is a cross-sectional view of the lock detection sensor assembly taken along lines 8-8 of FIG. 7;

FIG. 9 is a perspective view of the lock detection sensor assembly of FIG. 5 and shown in an open, unlocked position;

FIG. 10 is a cross-sectional view of the lock detection sensor assembly taken along lines 10-10 of FIG. 9; and FIG. 11 is a perspective view of the normally open lock detection sensor assembly of FIG. 9 and shown with the cover removed for illustration.

DETAILED DESCRIPTION

Figure 1:
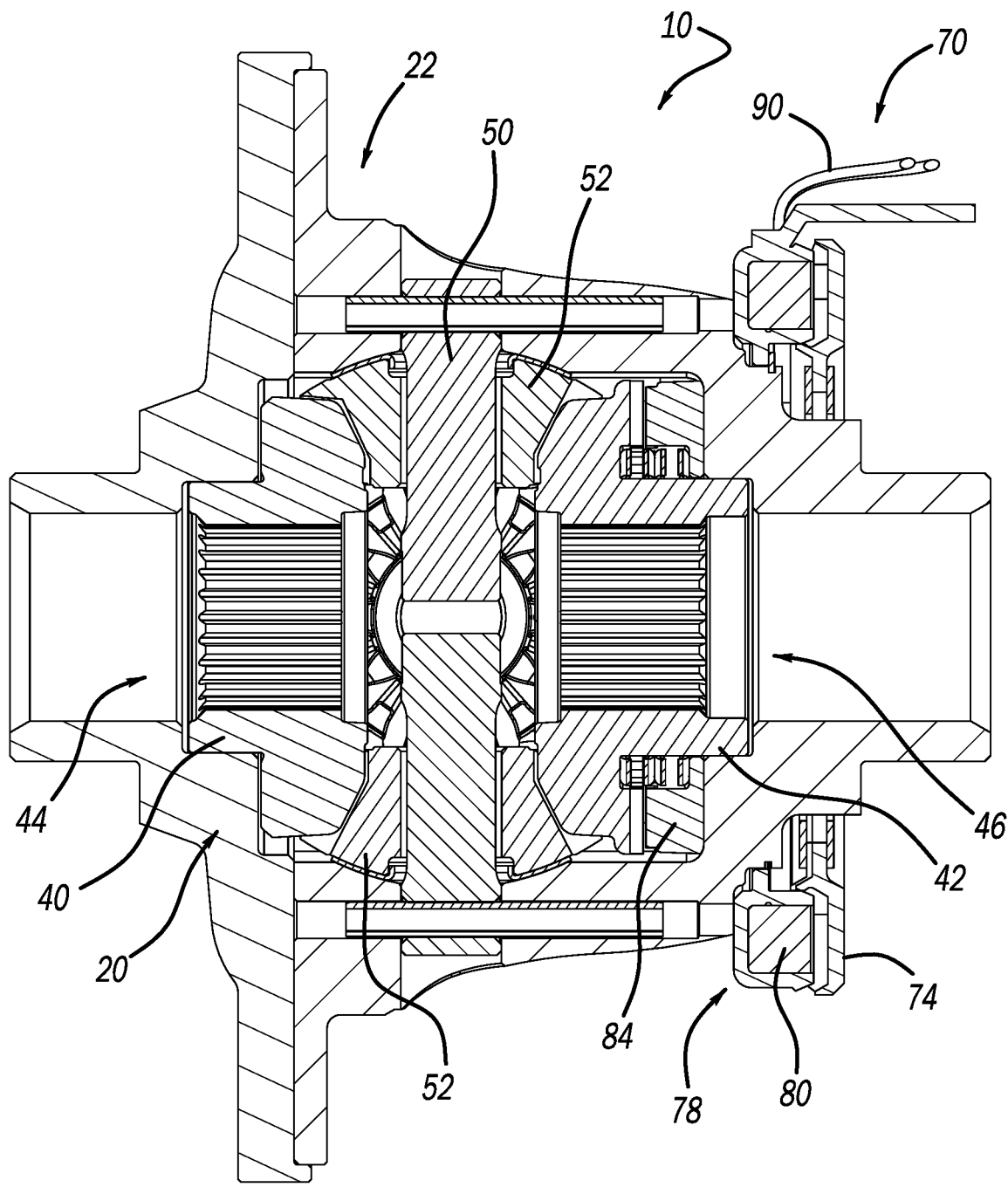
FIG. 1 is a cross-sectional view of an electronically locking differential gear mechanism according to one example of the present disclosure.

With initial reference to FIG. 1, an electronically locking differential assembly constructed in accordance to the present disclosure is shown and generally identified at reference 10. The electronically locking differential assembly 10 can generally include a differential gear assembly or mechanism 20 arranged in a differential case 22. The electronically locking differential assembly 10 can be received in a housing (not shown) and operates to drive a pair of axle shafts (not shown) that are connected to drive wheels (not shown).

The differential gear assembly 20 includes a pair of side gears 40 and 42 that are mounted for rotation with the axle shafts (and first and second drive wheels). The side gears 40 and 42 define first and second axle shaft openings 44 and 46. A cross pin or pinion gear shaft 50 can be fixedly mounted to the differential case 22 for rotation therewith. A corresponding pair of pinion gears 52 are mounted for rotation with the pinion gear shaft 50 and are in meshing relationship with both of the side gears 40 and 42.

It will be understood that, under certain operation conditions, such as when the vehicle is turning, or a slight difference in tire size exists, it is permissible for a certain amount of differentiating action to occur between the side gears 40 and 42. However, in accordance with the electronically locking differential assembly 10 of the instant application, no clutch packs or other mechanisms exist which merely retard or limit differentiating action. Instead, the electronically locking differential assembly 10 operates in either an unactuated, unlocked mode (effectively acting as an "open differential"), or operates in an actuated, locked mode.

The electronically locking differential assembly 10 includes a lock actuation mechanism 70 that generally includes an armature 74 and a stator assembly 78. The armature 74 is piloted by the stator assembly 78. The stator assembly 78 includes an electromagnetic coil 80. The armature 74 is coupled for translation with a lock plate 84. The electronically locking differential assembly 10 is shown in FIG. 1 in an open state wherein the electromagnetic coil 80 is not energized (corresponding to the unactuated, unlocked condition). When the electromagnetic coil 80 is energized, the armature 74 is caused to translate toward the electromagnetic coil 80 thus moving the lock plate 84 leftward as viewed in FIG. 1. The lock plate 84 causes the side gear 42 to be locked for concurrent rotation with the side gear 40 corresponding to the actuated, locked condition. The electromagnetic coil 80 is energized by means of a pair of electrical leads 90, also referred to herein to identify an electrical input signal to the lock actuation mechanism 70.

Figure 2:
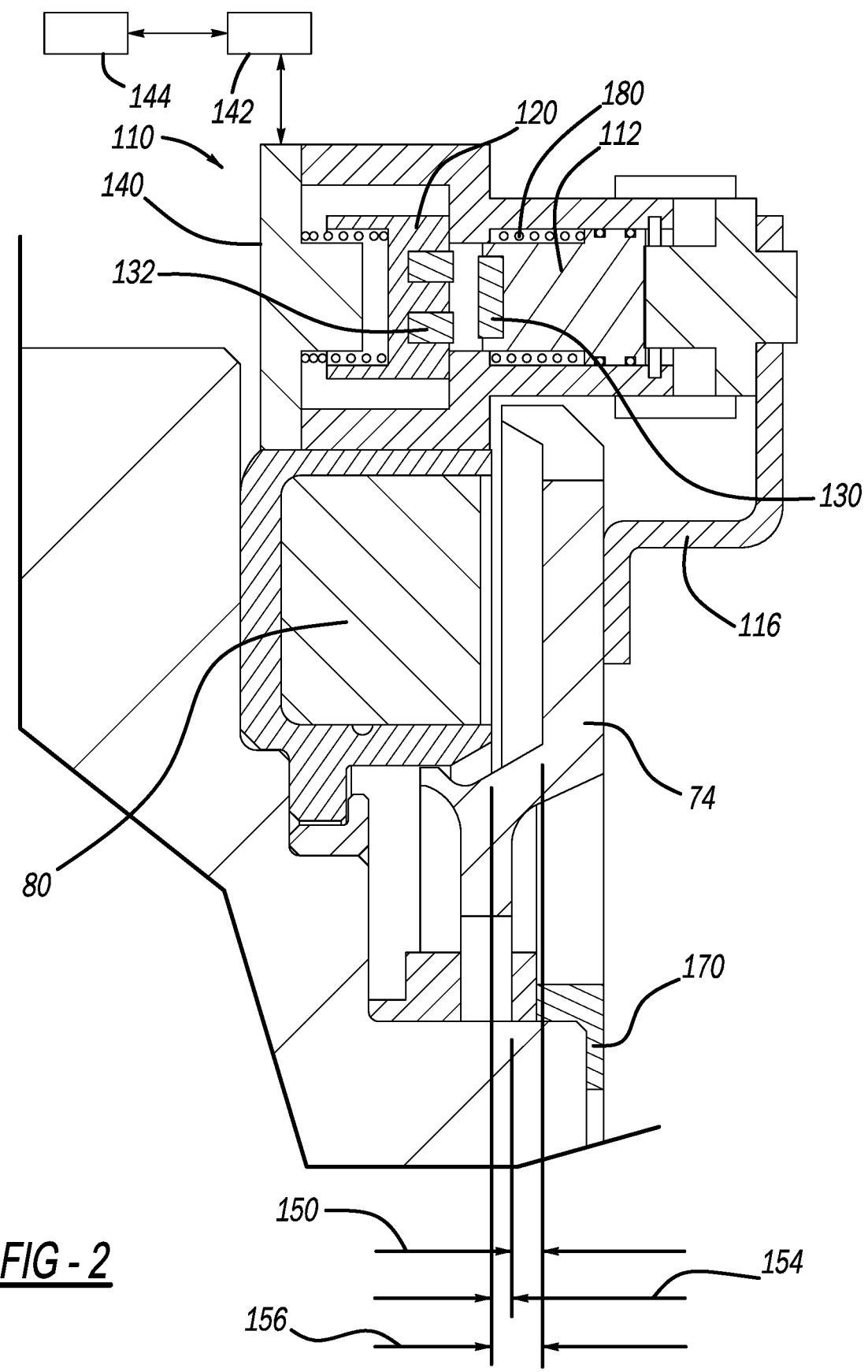
FIG. 2 is a detail cross-sectional view of the electronically locking differential gear mechanism of FIG. 1 illustrating a lock detection sensor assembly constructed in accordance to one example of the present disclosure.
Figure 3:
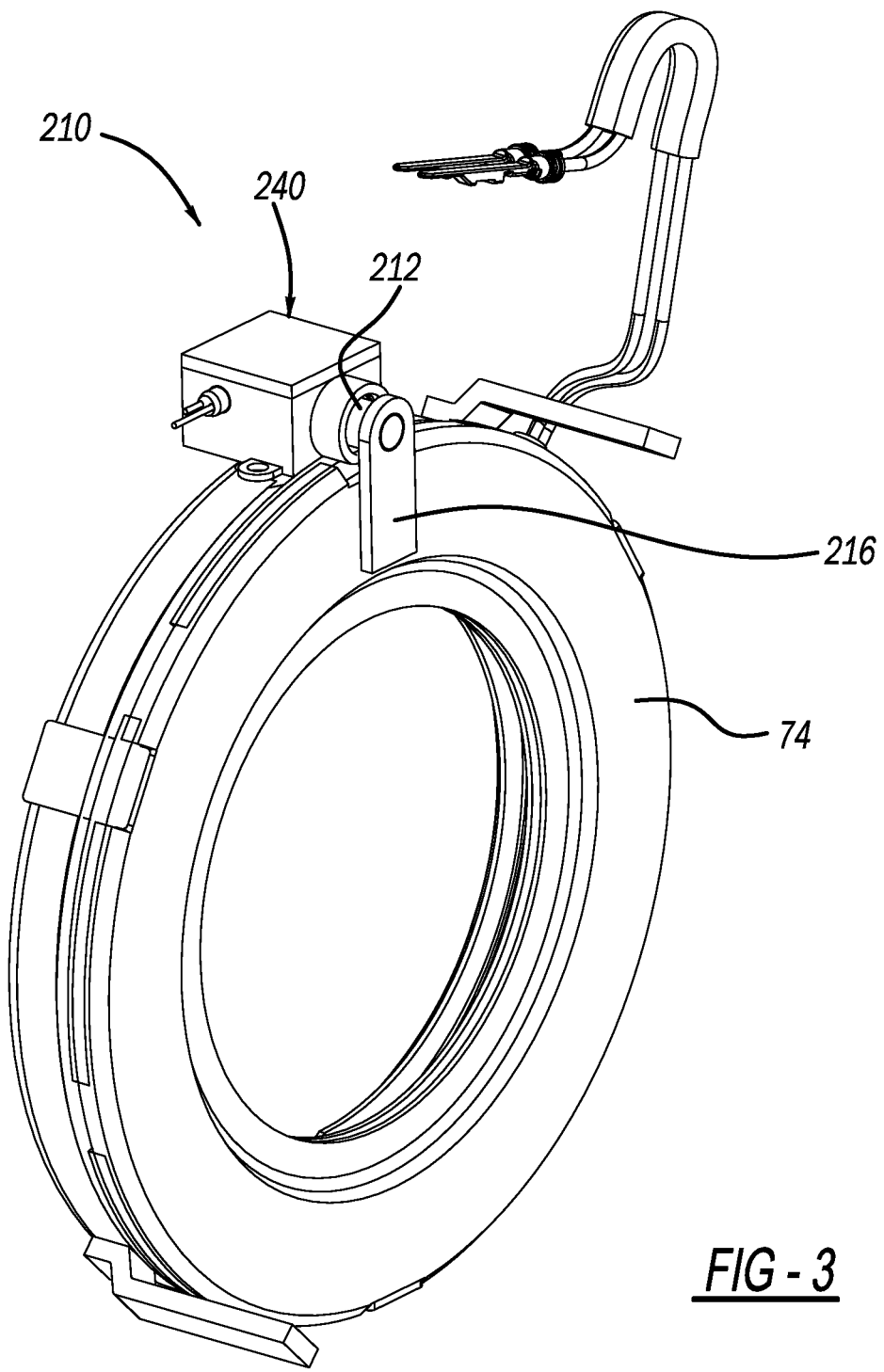
FIG. 3 is a perspective view of a normally closed lock detection sensor assembly constructed in accordance to another example of the present disclosure.

With further reference now to FIGS. 2 and 3, additional features of the electronically locking differential assembly 10 will be described. The electronically locking differential assembly 10 according to the present disclosure includes a lock detect mechanism 110. The lock detect mechanism 110 generally includes a first member 112 coupled to a bracket 116 that moves relative to a second member 120. In the example shown, the first member 112 is fixed for translation with a bracket 116. The bracket 116 is fixed for movement with the armature 74.

As can be appreciated, when the armature 74 moves toward the electromagnetic coil 80 (i.e., when moving the differential gear assembly 20 into the actuated, locked position), so too does the bracket 116 and first member 112. The first member 112 has first terminals 130. The second member 120 includes second terminals 132. When the first and second terminals 130, 132 move to a predetermined position relative to each other, a switch 140 closes and sends a signal to a controller 142 indicative to a locked state of the electromagnetically locking differential assembly 10. The controller 142 can send a signal to an instrument cluster 144 of the vehicle conveying to the driver that the electromagnetically locking differential assembly 10 is locked. As identified above, in some examples the electronically locking differential assembly 10 can remain locked even subsequent to de-energizing the coils 80 (in some examples without the driver being aware). In this regard, while a driver may have switched the electromagnetically locking differential 10 to an unlocked position, the electromagnetically locking differential 10 can remain locked. As can be appreciated, with the lock detect mechanism 110 of the instant configuration, the driver is provided real-time assurance that the electromagnetically locking differential assembly 10 is in an unlocked state.

According to additional features, the armature 74 can translate a first distance 150 whereby the switch 140 remains open. In one exemplary configuration, the first distance 150 can be 1.25 mm. The armature 74 can further translate a second distance 154 whereby the switch 140 is closed. In some examples, the switch 140 can be closed throughout travel along the second distance 154. In one exemplary configuration, the second distance 154 can be 1.25 mm. A total gap 156 therefore of the first and second distances 150, 154 is 2.5 mm. Other distances are contemplated and within the scope of the present disclosure.

A shoulder bolt 170 can be screwed into a press-pin that is pressed into the lock plate 84. Other configurations are contemplated that can directly couple the armature 74 to the lock plate 84. As the armature 74 is being urged toward the electromagnetic coil 80, the shoulder bolt 170 can create a direct translation to the lock plate 84. A biasing member 180 biases the first member 112 in a direction rightward as viewed in FIG. 2 toward the open position.

Figures 4A, 4B:
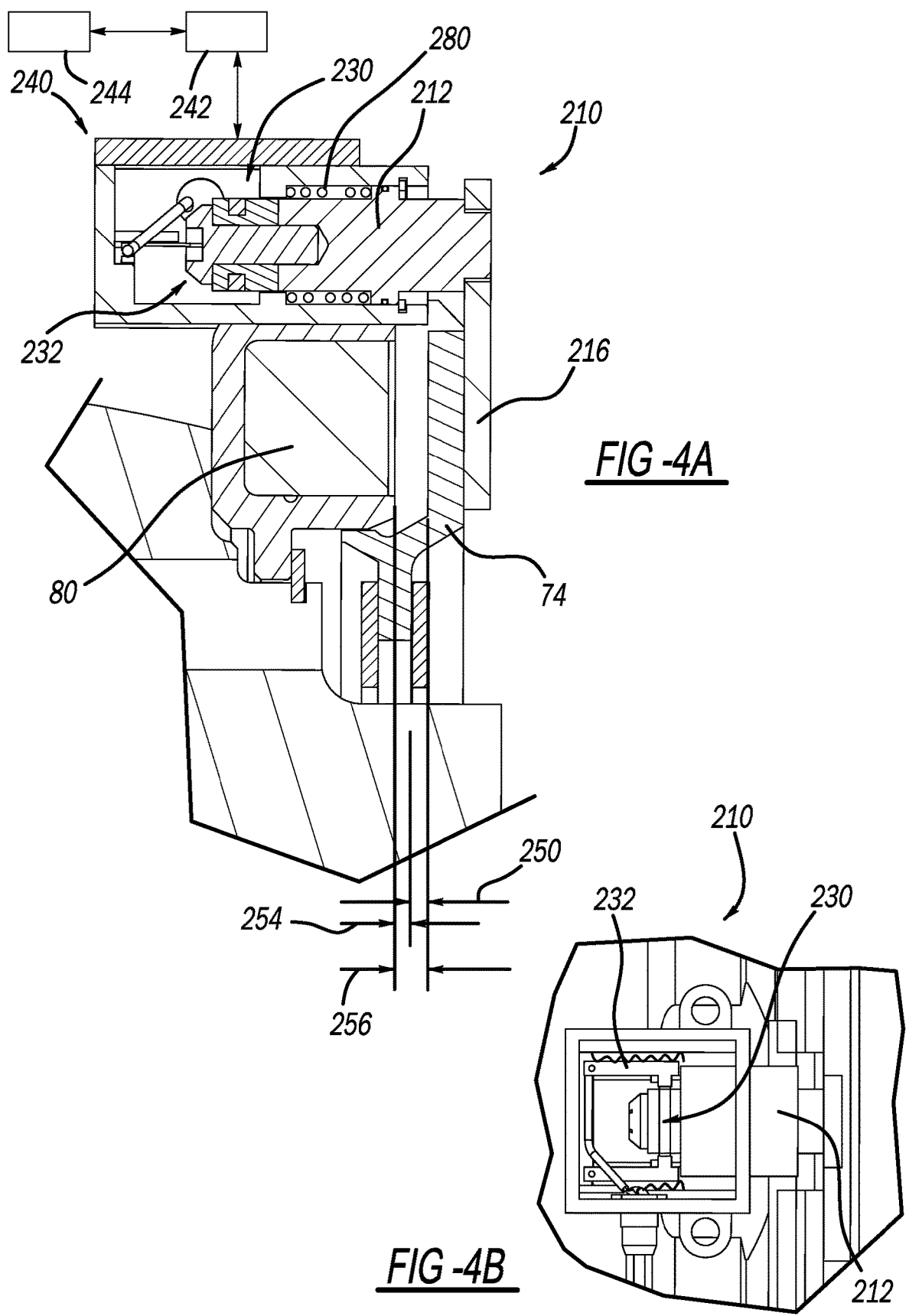
FIG. 4A is a cross-sectional view of the lock detection sensor assembly taken along lines 4-4 of FIG. 3 and shown in an open position.
FIG. 4B is a side view of the lock detection sensor assembly of FIG. 4A and shown in a closed position.

Turning now to FIGS. 3-4B, a lock detect mechanism 210 constructed in accordance to additional features is shown. The lock detect mechanism 210 is a normally closed mechanical switch. The lock detect mechanism 210 generally includes a first member 212 coupled to a bracket 216 that moves relative to a second member 220. The first member 212 is fixed for translation with a bracket 216. The bracket 216 is fixed for movement with the armature 74. As can be appreciated, when the armature 74 moves toward the electromagnetic coil 80, so too does the bracket 216 and first member 212. The first member 212 has first terminals 230. The second member 220 includes second terminals 232. When the first and second terminals 230, 232 move to a predetermined position relative to each other, a switch 240 opens and sends a signal to a controller 242 indicative to a locked state of the electromagnetically locking differential assembly. The controller 242 can send a signal to an instrument cluster 244 of the vehicle conveying to the driver that the electromagnetically locking differential assembly 10 is locked.

According to additional features, the armature 74 can translate a first distance 250 whereby the switch 240 remains closed. In one exemplary configuration, the first distance 250 can be 1.25 mm. The armature 74 can further translate a second distance 254 whereby the switch 240 is open. In some examples, the switch 240 can be open throughout travel along the second distance 254. In one exemplary configuration, the second distance 254 can be 1.25 mm. A total gap 256 therefore of the first and second distances 150, 154 is 2.5 mm. Other distances are contemplated and within the scope of the present disclosure. A biasing member 280 biases the first member 212 in a direction rightward as viewed in FIG. 2 toward the closed position.

Turning now to FIGS. 5-11, a lock detect mechanism 310 constructed in accordance to additional features is shown. The lock detect mechanism 310 is a normally open mechanical switch. The lock detect mechanism 310 is shown in a closed position (corresponding to the differential assembly 10 being in the actuated, locked position) in FIGS. 5-8. The lock detect mechanism 310 is in an open position (corresponding to the differential assembly 10 being in the unactuated, unlocked position) in FIGS. 9-11. The lock detect mechanism 310 generally includes a first member 312 in the form of a pawl that moves relative to a second member 320. The first member 312 is configured to rotate upon translation of the bracket 324. In the example shown, a post 326 coupled to the bracket 324 urges a swing arm 328 fixed to a shaft 330 to rotate. The first member 312 in turn rotates with the shaft 330 and makes contact with the second member 320 in the closed position closing a switch 336. A biasing member 334 urges the shaft 330 to rotate in a counterclockwise direction as viewed in FIG. 7 to an open position. In this regard, the first member 312, the second member 320 and the biasing member 334 can be collectively comprise a spring loaded terminal 338.

The bracket 324 is fixed for movement with the armature 74. As can be appreciated, when the armature 74 moves toward the electromagnetic coil 80, so too does the bracket 324 and ultimately the first member 312. When the switch 336 closes, a signal is sent to a controller 342 indicative to a locked state of the electromagnetically locking differential assembly 10. The controller 342 can send a signal to an instrument cluster 344 of the vehicle conveying to the driver that the electromagnetically locking differential assembly 10 is locked.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. An electronically locking differential assembly comprising:
    a differential casing defining first and second output shaft openings that are co-axially aligned along an axis of rotation of the differential casing;
    a first and a second side gear rotatably mounted within the differential casing, the first and second side gears being co-axially aligned along the axis of rotation of the differential casing, the first side gear defining a first shaft opening configured to provide a first torque transmitting connection with a first output shaft received within the first output shaft opening, the second side gear defining a second output shaft opening configured to provide a second torque transmitting connection with a second output shaft received within the second output shaft opening;
    a lock actuation mechanism that selectively moves between a locked state where the side gears are fixed for concurrent rotation and an unlocked state where the side gears rotate relative to each other, the lock actuation mechanism including an armature and a stator assembly, the stator assembly having an electromagnetic coil; and
    a lock detect mechanism that detects whether the lock actuation mechanism is in the locked or unlocked state, the lock detect mechanism including a first member fixed for concurrent movement with the armature and that moves relative to a second member, the first member coupled to a bracket that is fixed for movement with the armature, wherein the first member has first terminals and the second member has second terminals, wherein the first and second terminals move to a predetermined position relative to each other until a switch changes state and sends a signal to a controller indicative of the locked state.

2. The electronically locking differential assembly of claim 1 wherein the armature is configured to translate along a first distance whereby the switch remains in a first state and subsequently translates along a second distance whereby the switch remains in a second state.

3. The electronically locking differential of claim 2 wherein the switch is normally open.

4. The electronically locking differential of claim 2 wherein the switch is normally closed.

5. The electronically locking differential of claim 1 wherein the first member rotates upon translation of the bracket.

6. The electronically locking differential of claim 5, further comprising a biasing member that biases the first member toward an open position indicative of an unlocked state.

7. The electronically locking differential of claim 6 wherein the first member comprises a pawl that rotates into contact with the second member.

8. The electronically locking differential of claim 7 wherein the pawl is fixed for rotation with a shaft that is caused to rotate upon rotation of a swing arm configured on the lock detection mechanism.

9. The electronically locking differential of claim 8, further comprising a post coupled to a bracket, the post engaging and urging the swing arm to rotate upon translation of the bracket.

10. The differential gear assembly of claim 1, further comprising a pair of pinion gears intermeshed with the first and second side gears to form a torque transfer arrangement configured for transferring torque between the pinion gears and the first and second side gears to rotate the first and second side gears about the axis of rotation, the torque transfer arrangement also being configured for allowing the first and second side gears to rotate at different rotational speeds with respect to one another about the axis of rotation in the unlocked state.

11. The differential gear assembly of claim 1 wherein the lock detect mechanism comprises a normally open mechanical switch.

12. An electronically locking differential assembly comprising:
    a differential casing defining first and second output shaft openings that are co-axially aligned along an axis of rotation of the differential casing;
    a first and a second side gear rotatably mounted within the differential casing, the first and second side gears being co-axially aligned along the axis of rotation of the differential casing, the first side gear defining a first shaft opening configured to provide a first torque transmitting connection with a first output shaft received within the first output shaft opening, the second side gear defining a second output shaft opening configured to provide a second torque transmitting connection with a second output shaft received within the second output shaft opening;
    a lock actuation mechanism that selectively moves between a locked state where the side gears are fixed for concurrent rotation and an unlocked state where the side gears rotate relative to each other, the lock actuation mechanism having an armature that is configured to translate upon energization of an electromagnetic coil; and
    a lock detect mechanism that detects whether the lock actuation mechanism is in the locked or unlocked state, the lock detect mechanism further comprising:
        a normally open switch that moves between an open position corresponding to the unlocked state and a closed position corresponding to the locked state, the normally open switch having a first member that is configured to move with the armature relative to a second member:
            along a first distance corresponding to the open position; and along a second distance corresponding to the closed position;

a first terminal disposed on the first member and a second terminal disposed on the second member, wherein first and second terminals are a sufficient distance apart along the first distance whereby the normally open switch remains open; and wherein the first member comprises a pawl that rotates into contact with the second member, wherein the pawl is fixed for rotation with a shaft that is caused to rotate upon rotation of a swing arm configured on the lock detection mechanism, the lock detect mechanism further comprising a post coupled to a bracket, the post engaging and urging the swing arm to rotate upon translation of the bracket.

13. The electronically locking differential assembly of claim 12 wherein the bracket is fixed for movement with the armature.

14. An electronically locking differential assembly comprising:

a differential casing defining first and second output shaft openings that are co-axially aligned along an axis of rotation of the differential casing;

a first and a second side gear rotatably mounted within the differential casing, the first and second side gears being co-axially aligned along the axis of rotation of the differential casing, the first side gear defining a first shaft opening configured to provide a first torque transmitting connection with a first output shaft received within the first output shaft opening, the second side gear defining a second output shaft opening configured to provide a second torque transmitting connection with a second output shaft received within the second output shaft opening;

a lock actuation mechanism that selectively moves between a locked state where the side gears are fixed for concurrent rotation and an unlocked state where the side gears rotate relative to each other, the lock actuation mechanism having an armature that is configured to translate upon energization of an electromagnetic coil; and a lock detect mechanism that detects whether the lock actuation mechanism is in the locked or unlocked state, the lock detect mechanism further comprising:

a normally closed switch that moves between a closed position corresponding to the unlocked state and an open position corresponding to the locked state, the normally closed switch having a first member that is configured to move with the armature relative to a second member:

along a first distance corresponding to the closed position; and along a second distance corresponding to the open position.

* * * * *